April 5, 1966  N. BERTA  3,244,267
CONVERGENCE APPARATUS
Filed Aug. 1, 1963  4 Sheets-Sheet 2
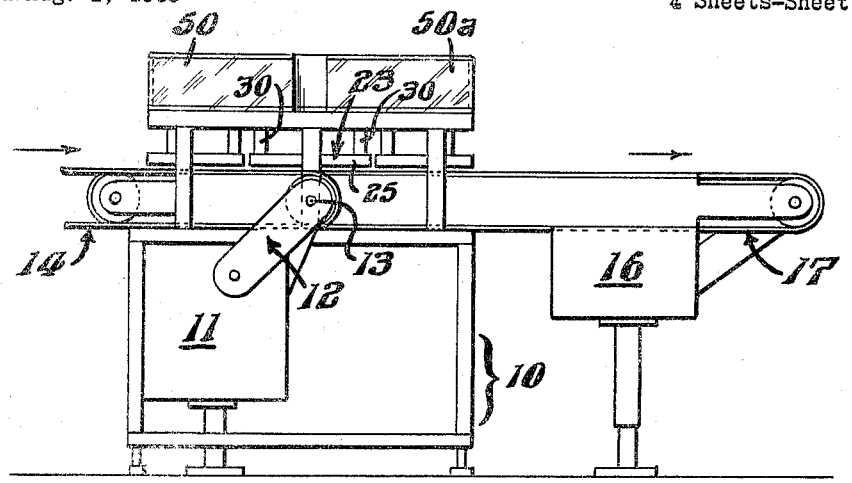
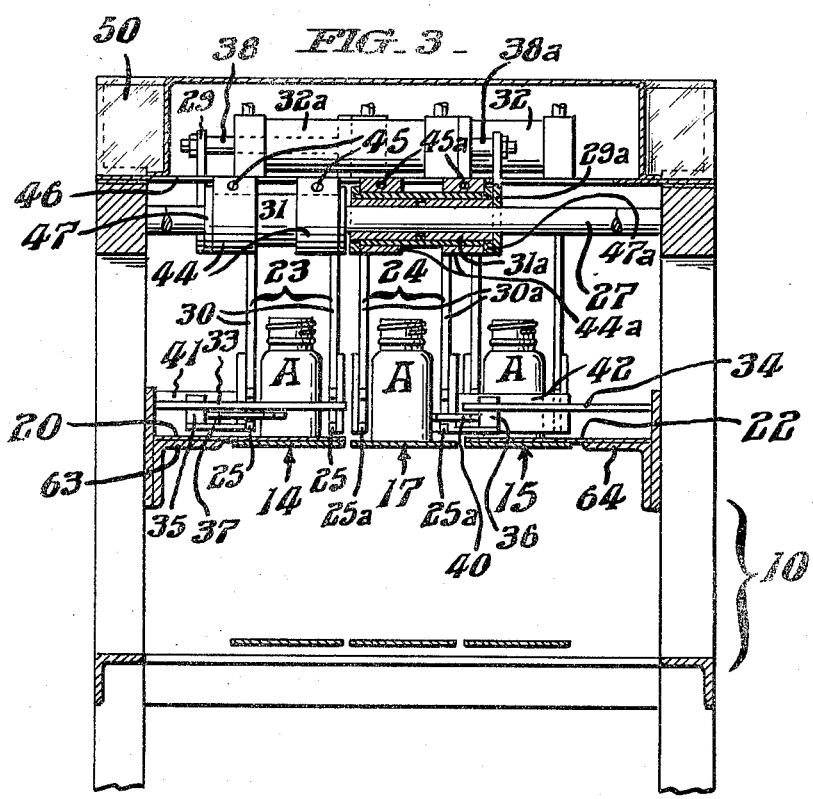
INVENTOR.
*Norbert Berta,*
BY
*Paul & Paul*
ATTORNEYS.

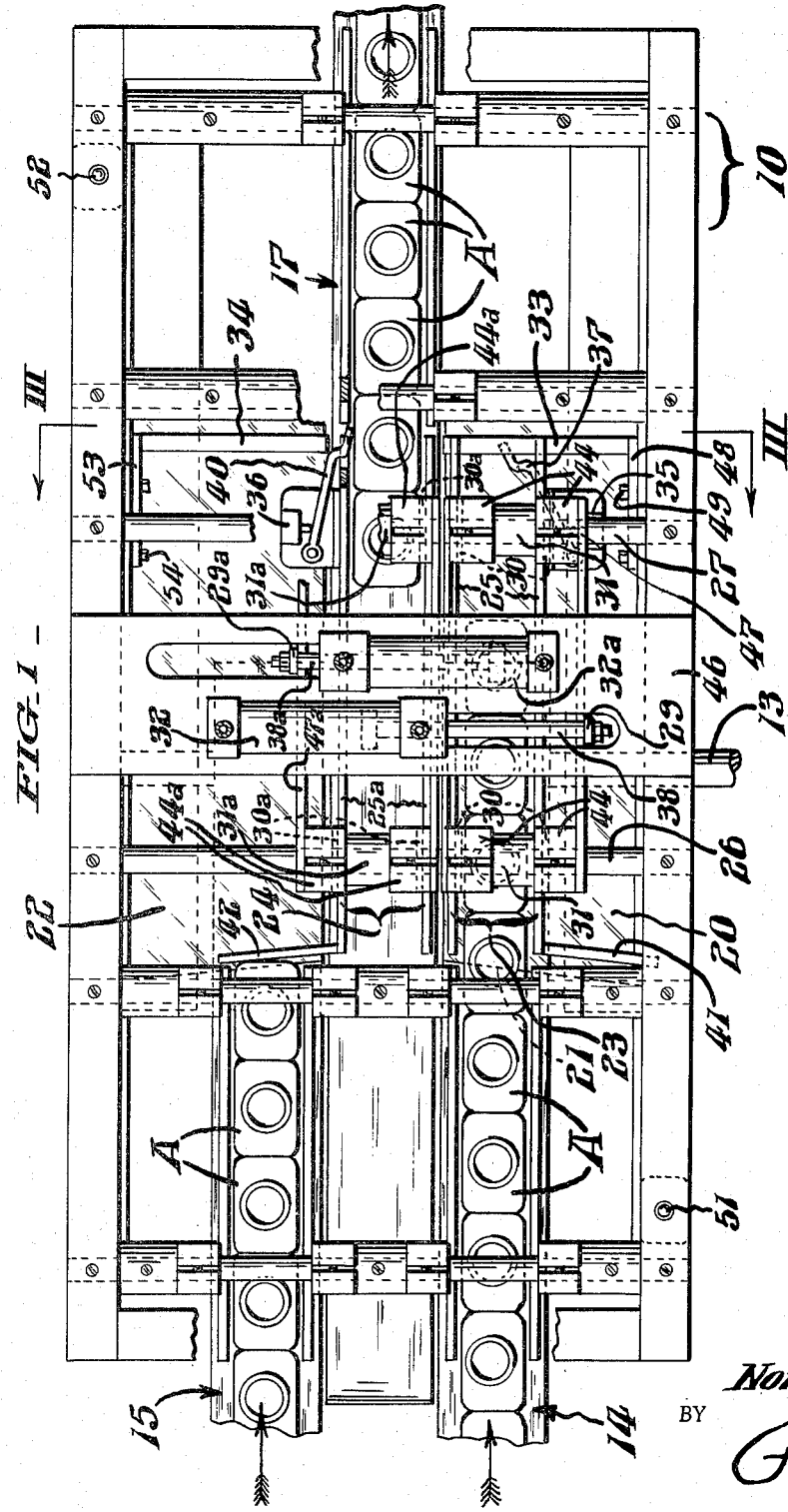

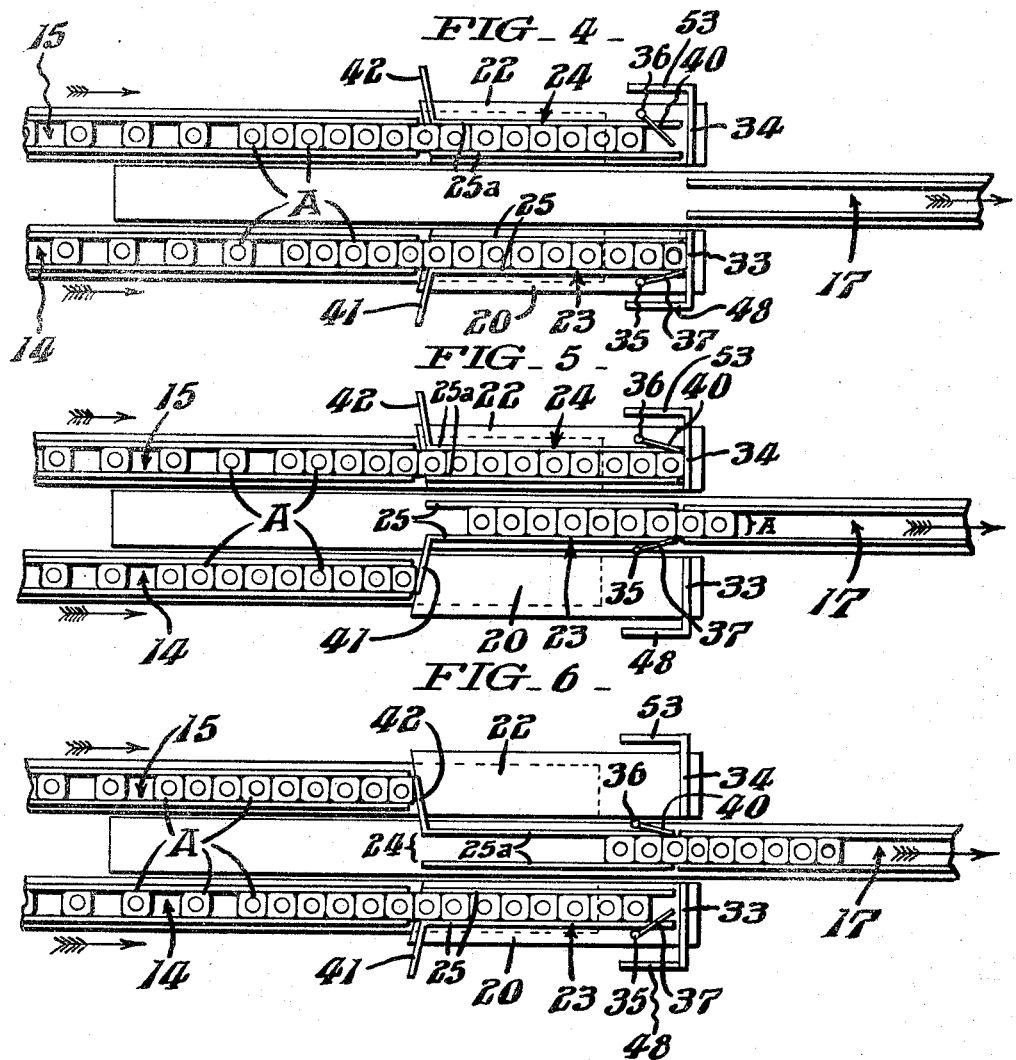

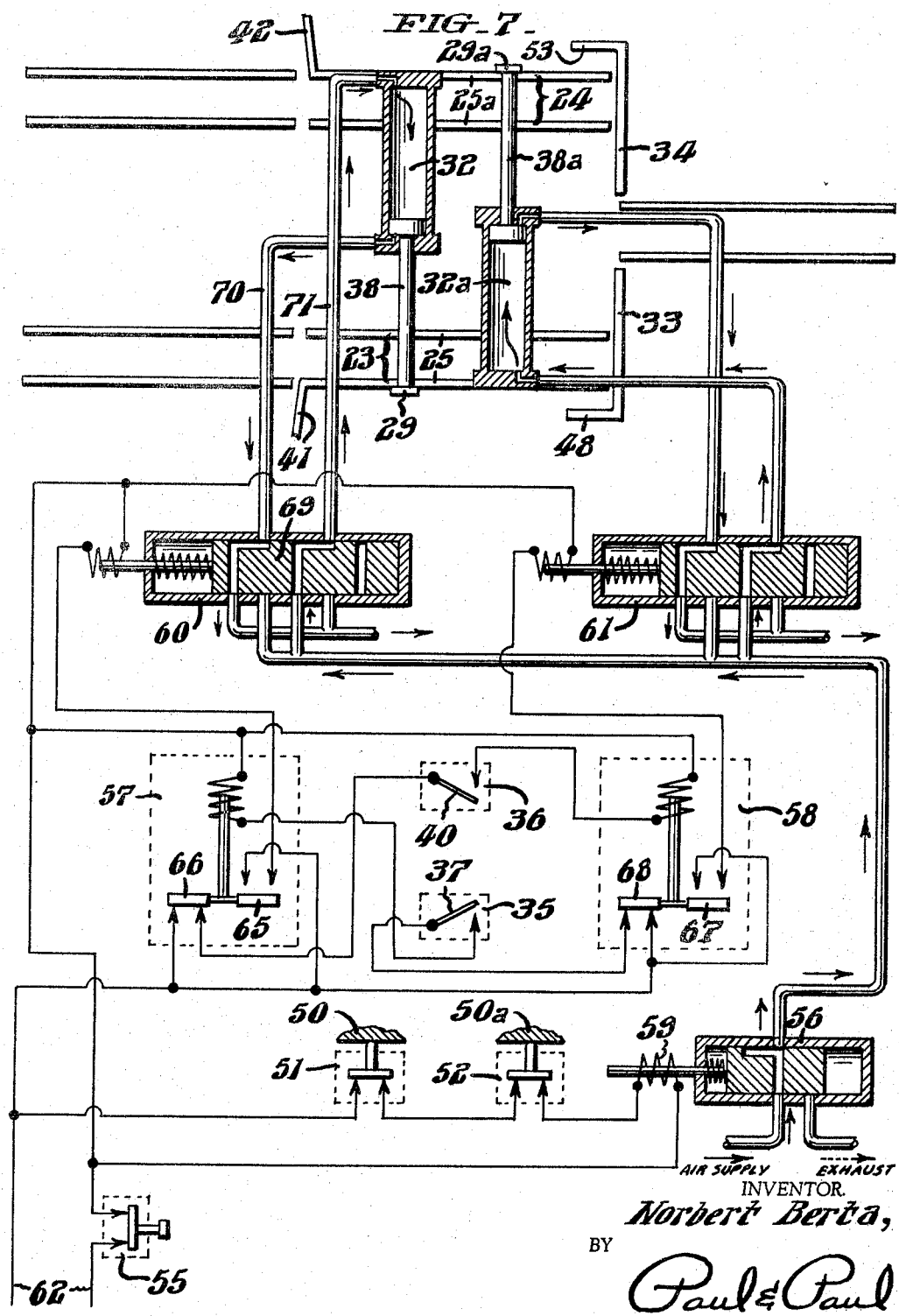

United States Patent Office 3,244,267
Patented Apr. 5, 1966

3,244,267
CONVERGENCE APPARATUS
Norbert Berta, Philadelphia, Pa., assignor to Merck & Co., Inc., Rahway, N.J., a corporation of New Jersey
Filed Aug. 1, 1963, Ser. No. 299,315
6 Claims. (Cl. 198—32)

This invention relates to an apparatus for converging conveyor feeds, and more specifically relates to an apparatus for converging separately moving random streams of articles which are similar in size and shape, into a single moving stream.

In bottle-filling operations, for example, when tablets or the like are counted and placed into bottles, such operations are often carried out on a plurality of production lines which are often arranged side by side in parallel relation to one another. Due to breakdowns or an inherent difference of capacity of different counting and loading machines, one such conveyor may provide filled bottles in a greater quantity per hour than the other, and the productive rates of each are found to vary from time to time. Similar situations are encountered in handling articles of various types.

It is an object of this invention to provide an apparatus for accepting input flows on two separate conveyors which are being provided with articles at different quantity rates, and for converging the articles carried on such conveyors and for smoothly providing an output flow of articles on a single conveyor. Still a further object of this invention is to provide an apparatus of the character indicated wherein fragile articles such as bottles and the like are merged into a common stream, wherein the articles on the output conveyor are packed face to face with one another and in regular arrangement, for delivery along a predetermined path.

Other objects and advantages of this invention, including the simplicity and economy of the same, will appear further hereinafter and in the drawings whereof:

FIG. 1 is a plan view of an apparatus representing a preferred form of this invention, with certain parts broken away in order to reveal important details;

FIG. 2 is a diagrammatic representation in side elevation of the principal features of the apparatus appearing in FIG. 1, with many details omitted;

FIG. 3 is a sectional view of the apparatus appearing in FIG. 1, taken as indicated by the lines and arrows III—III which appear in FIG. 1;

FIGS. 4, 5 and 6 are diagrammatic plan views, showing the sequences of operation of a form of converging apparatus according to this invention; and FIG. 7 represents a diagrammatic illustration of a preferred form of pneumatic and electrical system for controlling the automatic functioning of the apparatus appearing in the preceding figures.

In the description which follows, specific terms will be utilized for the sake of clarity, and it is to be understood that these specific terms are intended to be applied to the specific form of the invention selected for illustration in the drawings, and are not intended to define or to limit the scope of the invention which is defined in the appended claims.

Turning now to the specific form of the invention illustrated in FIGS. 1–3, the number 10 designates a supporting frame for the apparatus (see particularly FIG. 2), supporting a drive means 11 preferably in the form of an electric motor, which is connected by means of a power transmitting drive 12 to a shaft 13 which is arranged to drive infeed conveyor 14.

A similar drive means (not visible in FIG. 2), also preferably in the form of an electric motor, is connected to and drives infeed conveyor 15 in a manner similar to that by which drive means 11 drives infeed conveyor 14. It is to be assumed that the articles A deposited on the conveyors 14, 15 have the ability to slide with respect to the surfaces of the conveyors, so that they can be held stationary while the conveyor continues to move.

Inequality of article feeds is encountered when the articles A are deposited upon the conveyor belts 14, 15 at different rates, even though the conveyor belts themselves may be operating at equal speeds. In addition, the articles A on either infeed conveyor belt may not be uniformly spaced thereon, and the spacing, if any, between adjacent articles A on one infeed conveyor may vary widely with respect to the spacing between adjacent articles A on the other infeed conveyor. Finally, the conveyor belts of the infeed conveyors 14 and 15 do not necessarily run at equal speeds. Hence, it is to be assumed that the articles A flowing into the apparatus on the input conveyor 14 flow at a different quantity rate than the articles fed into the apparatus on the input conveyor 15, and that these rates can vary widely with respect to one another.

A separate drive motor 16 is connected to drive an output conveyor 17 at a constant speed which is preferably greater than the surface speeds of the input conveyors 14, 15. As appears in FIG. 1, the output conveyor 17 is located along a line which is parallel to and intermediate the lines of advancement of the input conveyors 14, 15, and is equally spaced between them.

Located at the downstream end of conveyor 14 and immediately above it is a stationary article supporting plate 20 having a leading edge 21 which is feathered in a manner to accommodate the articles from the conveyor 14 so that the articles may slide onto the upper surface of the plate 20 in response to the push against them of articles further back on the conveyor 14.

The articles engage one another, successively, and slide over the upper surface of plate 20 until the foremost article engages the stop 33. In this manner a number of articles are accumulated at the downstream end of conveyor 14, largely on the upper surface of plate 20, and so this area serves as an article receiving station.

Similarly, a stationary plate 22 is provided at the downstream end of conveyor 15, and associated with it is article stop 34.

Output conveyor 17 is positioned between the article receiving stations of infeed conveyors 14 and 15.

Carrier or article moving means 23, 24 are provided for shifting the articles accumulated in the respective article receiving stations onto the output conveyor 17.

Considering first the carrier or article moving means 23 associated with infeed conveyor 14, this includes two side rails 25 (see FIG. 3) preferably positioned parallel to upper surface of plate 20 and extending longitudinally of the path of travel of articles A for a distance equal to the distance spanned by a plurality of articles A engaging one another in line. The rails are supported at the bottoms of two pairs of vertical strips or hangers 30 to which they are secured. The top of one pair of hanger strips 30 is suspended from cross shaft 26, while the top of the other pair of hanger strips 30 is suspended from cross shaft 27. This is accomplished by having the top of each hanger strip 30 fastened (as by welding), to a collar 44 which fits around the exterior of a sleeve 31, this sleeve fitting over shaft 26 and adapted to move axially along such shaft. The two collars 44 are adjustably secured to the sleeve 31 by means of the screws 45. Hence, by adjusting the position of collars 44 on the sleeve 31, the space between the side rails 25 is adjusted, thereby readily enabling the apparatus to accommodate articles of different width.

To move the sleeve 31 axially on its supporting shaft 26, and thus to move the side rails 25 in a direction transverse to the line of travel of the articles A on infeed conveyor 14, the pneumatically operated cylinder 32 and its piston rod 38 are provided. The two ends of cylinder 32 are secured to supporting plate 46 that in turn is secured to frame 10. The outer end of the piston rod 38 has a shoulder against which abuts drive bar 29, the end of the piston rod extending through the drive bar and having a nut threaded thereon to secure the drive bar 29 to the piston rod 38 against such shoulder. The lower end of drive bar 29 is secured to the longitudinally extending sleeve bar 47 which has a hole at each end into which the outer ends of the two sleeves 31 are press fitted.

The upstream end of the carrier or article moving means 23 has a barrier bar 41 secured to the outer rail 25 for preventing the flow of articles from infeed conveyor 14 into the article receiving station, including the upper surface of plate 20, when the article moving means is displaced from its article receiving position, shown in FIGS. 1, 4, 6 and 7, to its article discharging position, shown in FIG. 5.

The construction of the apparatus for shifting the articles accumulated from the infeed conveyor 15 onto the output conveyor 17 is similar to that just described for shifting the articles accumulated from the infeed conveyor 14 onto the output conveyor 17.

The carrier or article moving means 24 includes two side rails 25a supported by two pairs of hangers 30a, one pair being suspended from cross shaft 26 and the other from cross shaft 27. The top of each hanger 30a is secured to a collar 44a, these collars being adjustably secured to sleeves 31a by screws 45a.

Pneumatically operated cylinder 32a has the outer end of its piston rod 38a secured to drive bar 29a. The lower end of drive bar 29a is secured to sleeve bar 47a, the ends of which are press-fitted over the two sleeves 31a.

The carrier or article moving means 24 has a barrier bar 42 secured to the outer rail 25a, operating with respect to infeed conveyor 15 in the same manner as does barrier 41 with respect to conveyor 14. FIG. 6 shows the barrier 42 preventing the flow of articles from infeed conveyor 15 into the associated article receiving station.

Article stop 33 engaged by the foremost article in the article receiving station for conveyor 14 (see FIGS. 1 and 4–7), has an angle piece 48 with slots therein, through which slots screws 49 pass and secure the stop to the frame 10. The slots enable the stop to be adjusted in the direction of movement of the articles from the infeed conveyor 14, and thus regulate the longitudinal length of the article receiving station. Such an adjustment of this article stop 33 may be desirable when the size of the articles which are conveyed to the apparatus by infeed conveyor 14 is changed, particularly in the side parallel to the direction of travel of the conveyor.

The corresponding article stop 34 associated with the infeed conveyor 15 has a similar angle piece 53 and adjusting screws 54.

The article supporting plate 20 associated with infeed conveyor 14 is supported by, and secured to, angle strip 63, which in turn is secured to frame 10 (see FIG. 3). The plate 20 is preferably secured to the angle strip 63 by screws (not shown) passing through longitudinal slots in the plate, so that the position of the plate can be adjusted in a direction parallel to the feed of the articles from the infeed conveyor 14. In this manner the number of articles accumulated in the article receiving station that have disengaged from the top surface of the infeed conveyor 14 may be adjusted. In some situations it may be desirable to have the bottoms of less than all of the articles in the article receiving station free from engagement with the top surface of the infeed conveyor 14, in order to reduce the number of articles that must be accumulated in engagement with one another upstream of the apparatus that serve to push the articles in the forward portion of the accumulation over the length of plate 20 and bring the foremost article into engagement with article stop 33.

Similarly, article supporting plate 22 is supported by angle piece 64, and preferably adjustably secured thereto.

Cover plates 50 and 50a are provided which protect the articles while they are being handled in the converging machine. The cover plates 50 and 50a are mounted upon the upper portions of the side frames, which carry bleed switches 51, 52 such that the bleed switches are actuated by the weights of the covers. As will be seen hereinafter, the removal of the cover plates 50 and 50a deenergizes the bleed switches, inactivating the entire apparatus so that it may be adjusted with safety when the cover plates are removed.

As seen in FIG. 1, automatic switch means are provided for controlling the operation of the apparatus. Microswitch 35 is adjustably fixed to the carrier or article moving means 23 so as to move with the latter as it moves laterally across the machine with respect to the path of infeed conveyor 14. Microswitch 35 has a feeler arm 37 which is engaged by the foremost article in the article receiving station when that article reaches article stop 33. The resulting movement of feeler arm 37 from its normal position closes the contact of the microswitch 35. The feeler arm then remains in the actuated position while the accumulated articles in the article receiving station are moved over to the output conveyor 17, and while the articles so accumulated and moved over to the output conveyor 17 are moved away from the apparatus by the output conveyor 17. When the last of the accumulated articles clears the rails 25 of article moving means 23, the feeler arm 37 no longer engages an article, and so returns to its original (and normal) position (as shown in FIGS. 1, 6 and 7), where the contacts of the microswitch 35 are open.

Microswitch 36 and its feeler arm 40, associated with conveyor 15, is similar in construction and mounting to microswitch 35 and its feeler arm 37 associated with conveyor 14, and the operation of the former microswitch in response to articles delivered to the apparatus by infeed conveyor 15 is similar to the operation of microswitch 35 in response to articles delivered to the apparatus by infeed conveyor 14.

Each microswitch is connected in a manner to be discussed in more detail hereinafter, to energize the corresponding cylinders 32 or 32a to actuate the sideward movement of the associated carrier or article moving means 23 or 24.

Turning now to FIG. 7 of the drawings, the automatic operation of the apparatus will now be described. Assuming that the cover plates are in position, and that the "on" switch 55 is closed, power from source 62 is provided to the conveyor motors and they are driven at predetermined speeds which may be either equal or different. Assuming the covers 50 and 50a are in position, bleed switches 51 and 52 are closed so as to energize the solenoid 59 of solenoid valve 56 from the power source 62. This valve is thereupon actuated to cause air under pressure from a source (not shown) to be supplied through the tubing shown in FIG. 7 to the controlling system.

Electrical relay 57, associated with infeed conveyor 14, has a set of normally-open front contacts 65 and a set of normally-closed back contacts 66. Electrical relay 58, associated with infeed conveyor 15, has a set of normally-open front contacts 67 and a set of normally-open back contacts 68.

The circuit for energizing the actuating coil of relay 57 from electrical source 62 includes the microswitch 35 associated with the same infeed conveyor, 14, and the back contacts 68 of the relay 58 associated with the other infeed conveyor, 15. Similarly, the circuit for energizing the actuating coil of relay 58 from electrical source 62 includes the microswitch 36 associated with the same infeed conveyor, 15, and the back contacts 66 of the relay 57 associated with the other infeed conveyor, 14. Consequently, by this electrical interlocking arrangement, neither relay 57 or 58 can be actuated while the other relay is actuated.

Assuming both relays 57 and 58 are in their normal, deenergized condition, as shown in FIG. 7, let it be further assumed that the articles from infeed conveyor 14 accumulate in the associated article receiving station and that eventually the foremost article reaches the article stop 33 and, at about the same time, actuates the feeler arm 37 of the microswitch 35 far enough to close the contacts of the microswitch. The closing of these contacts of microswitch 35 completes the circuit for energizing the actuating coil of relay 57, and this relay moves to close its front contacts 65 and to open its back contacts 66.

The front contacts 65 of relay 57, when closed, complete the circuit to energize the solenoid of valve 60 and thereby cause the movable element 69 of the valve to move leftwardly (as viewed in FIG. 7). This causes the valve to apply pneumatic pressure, through the tube 70, to the end of the cylinder 32 nearer the infeed conveyor 15, and to connect the other end of cylinder 32, through tube 71, to exhaust. The piston in cylinder 32 thereupon moves from its normal position, as shown in FIG. 7, to actuated position, and in so moving, the outer end of the piston rod 38 moves the carrier or article moving means 23, with its rails 25, from its normal, article receiving and accumulating position shown in FIG. 7, to the actuated position (as shown somewhat diagrammatically in FIG. 5) where the articles are over the output conveyor 17.

When the last of the articles so moved to be over the output conveyor 17 clears the feeler arm 37 of microswitch 35, the feeler arm returns to its normal position, in which the contacts of microswitch 35 are open. This action breaks the circuit energizing the actuating coil of relay 57, so that this relay returns to its original, normal position in which its front contacts 65 are open and its back contacts 66 are closed.

This return of the front contacts 65 to open position breaks the circuit energizing the solenoid of solenoid valve 60. The spring in the valve thereupon returns the valve element 69 to its original, normal position, as shown in FIG. 7, where air pressure is fed through tube 71 to the far end of the cylinder 32 (and the near end of the cylinder is connected through tube 70 to exhaust). As a result, the piston within the cylinder 62 moves from actuated position to normal position (as shown in FIG. 7) and at the same time returns the carrier or article moving means 23, with its rails 25, to its original, article receiving and accumulating position, as shown in FIG. 7.

The operation of cylinder 32a by microswitch 36, relay 58 and solenoid valve 61, is similar to that just described for cylinder 32 by microswitch 35, relay 57 and solenoid valve 60.

Turning now to FIGS. 4, 5 and 6, it will be appreciated that the articles traveling on the input conveyor 14 have just finished accumulating in the article receiving station and actuated the microswitch 35, energizing the cylinder 32, thus switching the article carrier 23 which moves toward the center to the position shown in FIG. 5 sliding the batch of articles A onto the output conveyor 17, at the same time stopping any further movement of articles A on the infeed conveyor 14 by means of the barrier bar 41. Due to the continuous movement of the output conveyor 17, the articles A are then moved downstream in the direction indicated by the arrows in FIG. 5. The microswitch 36 (in the meantime having been actuated by the articles A accumulating in the article receiving station for infeed conveyor 15), closes, but due to the electrical interlock, resulting from the back contacts 66 of relay 57 being in the energizing circuit for the actuating coil of relay 58, relay 58 is not actuated, and so the cylinder 32a is not actuated. However, as the articles A continue to flow along the conveyor 17 their presence is detected by the microswitch 35 and as the last article flows past the switch 35, it opens, thus deenergizing the relay 57, which in turn deenergizes the solenoid valve 60. Thus, the cylinder 32 returns the carrier 23 to the position shown in FIG. 6.

In the meantime, the closing of back contacts 66 of relay 57 (when it is deenergized), completes the circuit for energizing the relay 58. Hence this relay now operates to close its front contacts 67, which energizes the solenoid valve 61 and causes cylinder 32a to move carrier or article moving means 23a so as to shift the articles accumulated in the article receiving station for infeed conveyor 15, over to a position above the output conveyor 17. With this transverse movement, the barrier bar 42 prevents the further movement of articles A into the article receiving station and onto the plate 22.

It is thus clear that this apparatus automatically merges the two separate and independent streams of articles into a single stream in a simple and effective manner with a minimum of waiting or hold-up time regardless of the quantity flow rates in the two incoming streams and of their magnitude relative to each other. Even if one of the incoming streams becomes non-operating, the apparatus functions without reducing the quantity flow rate of the one operating incoming stream to the output stream. Hence, if the quantity flow rate of the incoming operating stream of articles is increased, to temporarily compensate in part for the non-operation of the other incoming stream of articles, the apparatus automatically adjusts itself to the new conditions and passes the articles on to the discharge stream without impairing or decreasing the new quantity flow rate.

The apparatus is self-protecting, and does not need a safety device to shut it down in case the next machine in an automatic processing line becomes inoperative, thereby causing the articles to accumulate on the output conveyor until they back up to this apparatus. Should this occur, the appropriate microswitch 35 or 36 would not return to its original, normal position, with the result that the operation of the apparatus automatically would be suspended until the output conveyor resumes operation and the appropriate microswitch does return to its original, normal position. This feature not only enables the safety device normally provided between machines in an automatic processing line to be omitted between this convergence apparatus and the next machine in line, but also enables the next machine to be placed closer to this convergence apparatus than otherwise, thereby lowering the over-all length of the automatic processing line and thus its attendant cost.

Further, the apparatus is simply and readily adapted to handle articles of different size, without the substitution of any parts.

It will be appreciated that although the articles shown in the drawings are bottles, any other articles of similar size and shape may be handled with effectiveness and efficiency according to this invention. Examples of other such articles are boxes, vials, blocks and any other articles of similar size and shape.

It will also be apreciated that although the drawings show an apparatus for converging articles from two conveyors to one conveyor, this invention may be repeated or pyramided in a variety of manners, to provide converging of articles from any number of conveyors to a smaller number of conveyors.

While this invention has been described with reference to a specific embodiment thereof, it will be apparent to those skilled in the art that various changes other than those referred to above may be made in the form of the device, that equivalent elements may be substituted for those illustrated in the drawings, that parts may be reversed, and that certain features of the invention may be used to advantage independently of the use of other features, all within the spirit and scope of the invention as defined in the appended claims.

What is claimed is:

1. In a converging apparatus for converging different streams of articles which are moving at different quantity rates, the combination comprising a pair of spaced-apart feed conveyors for the respective streams, stationary supporting means including spaced stations for receiving articles discharged by said conveyors, an output conveyor extending between said stations, a pair of carrier means each arranged for collecting a batch of articles received on said stations, said carrier means shiftable from said collecting position to a discharge position over the output conveyor by which the articles are removed from the carrier means, switch means associated with the carrier means and actuated by the presence of the articles collected in the carrier means, and automatic shifting means, responsive to actuation of the switch means, to shift said carrier means to said discharge position and responsive to deactuation of said switch means upon removal of the collected articles to shift said carrier means back to said collecting position.

2. An apparatus as set forth in claim 1 having also a barrier means associated with each carrier means for blocking the flow of articles from the associated incoming feed conveyor to the associated station when the automatic shifting means operates to shift the articles collected in said station over to the output conveyor.

3. An apparatus as set forth in claim 2 having also means responding to the operation of the automatic shifting means to prevent the shifting of articles from the station for one infeed conveyor over to the output conveyor while articles from the station for the other infeed conveyor are being discharged upon the output conveyor.

4. An apparatus as set forth in claim 3 having the switch means movable with the carrier means and positioned so that it remains actuated until the last article to be moved away by the output conveyor clears the carrier means.

5. In an apparatus for expeditiously merging onto one output belt conveyor the articles carried by two incoming belt conveyors under a wide variety of incoming feed conditions, so that there is a minimum of interruption to the continuity of the articles carried by the output belt conveyor, said apparatus comprising:
 (a) an article receiving station at the discharge end of each incoming belt conveyor for accumulating a predetermined number of articles delivered by its associated incoming belt conveyor,
 (b) power-actuated article moving means associated with each article receiving station for moving the articles accumulated in the associated article receiving station from their accumulated position to a discharge position, whereby such articles originally accumulated in the article receiving station are automatically moved away from the apparatus by the output belt conveyor;
  (i) each such article moving means having switch means, responsive to the arrival of the first article to reach the end of the associated station furthest from the associated incoming belt conveyor, for moving said switch means from normal position to actuated position, and for thereafter maintaining said switch means in actuated position until the last of the articles so accumulated is discharged onto the output belt conveyor and has moved downstream from said switch means;
 (c) barrier means associated with each article moving means for blocking the flow of articles from the associated incoming belt conveyor to the article receiving station when the articles in the article receiving station are moved from their accumulated position to their discharge position;
 (d) power controlling means associated with each power-actuated article moving means for controlling the application of power to its associated article moving means, each of said power controlling means
  (i) being responsive to the movement of the associated switch means from normal position to actuated position to cause the operation of the associated power-actuated article moving means to move the articles accumulated in its associated article receiving station from their accumulated position to their discharge position,
  (ii) being immediately thereafter responsive to the maintenance of the associated switch means in actuated position to maintain the associated article moving means in the article discharge position, and
  (iii) being responsive to the movement of the associated switch means from actuated position to normal position to cause the operation of the associated power-actuated article moving means to return to its original position corresponding to article accumulating position; and
 (e) interlock means, responsive to the operation of either one of the power controlling means that causes movement of the associated article moving means from its normal, article-accumulating position, for preventing the operation of the other power controlling means so long as the first power controlling means is in such operating condition.

6. An apparatus as set forth in claim 5, in which the power controlling means includes two relays, each with a set of front contacts and a set of back contacts, and also includes circuitry by which the actuation of the front contacts of one relay causes the associated article moving means to move from its normal, article-accumulating position to its discharge position, with the actuating coil for each relay including, in series in its energizing circuit, the contacts of its associated switch means and the back contacts of the other relay, whereby such back contacts and the associated circuitry serve as said interlock means.

References Cited by the Examiner
UNITED STATES PATENTS

| | | | |
|---|---|---|---|
| 976,264 | 11/1910 | Johnson | 198—32 |
| 2,219,827 | 10/1940 | Kimball et al. | |
| 2,315,670 | 4/1943 | Tascher et al. | 198—32 |
| 2,320,934 | 6/1943 | James et al. | 198—32 |
| 2,880,891 | 4/1959 | Carroll | 198—78 X |
| 3,036,692 | 5/1962 | Kiefer | 198—21 |

SAMUEL F. COLEMAN, *Primary Examiner.*

R. J. HICKEY, *Assistant Examiner.*